United States Patent
Oh et al.

(10) Patent No.: US 7,432,673 B2
(45) Date of Patent: Oct. 7, 2008

(54) METHOD, MEDIUM, AND APPARATUS CONTROLLING CURRENT GAIN CHANGE OF A SPINDLE MOTOR DRIVER

(75) Inventors: Kyoung-whan Oh, Seoul (KR); Cheol-hoon Park, Suwon-si (KR); Sang-hoon Chu, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/296,340

(22) Filed: Dec. 8, 2005

(65) Prior Publication Data

US 2006/0125429 A1 Jun. 15, 2006

(30) Foreign Application Priority Data

Dec. 11, 2004 (KR) .................. 10-2004-0104632

(51) Int. Cl.
*H02P 5/00* (2006.01)
*H02P 5/46* (2006.01)
*H02P 7/08* (2006.01)

(52) U.S. Cl. ...................................... 318/66

(58) Field of Classification Search ................ 318/66
See application file for complete search history.

(56) References Cited

U.S. PATENT DOCUMENTS 6,744,587 B2 6/2004 Ang et al.

FOREIGN PATENT DOCUMENTS

| JP | 5-64475 | 3/1993 |
| JP | 10-112109 | 4/1998 |
| JP | 2003-173640 | 6/2003 |

*Primary Examiner*—Lincoln Donovan
*Assistant Examiner*—Erick Glass
(74) *Attorney, Agent, or Firm*—Staas & Halsey LLP

(57) ABSTRACT

A method, medium, and apparatus for controlling a spindle motor of a disk drive. Particularly provided is a method, medium, and apparatus changing a current gain of a spindle motor driver according to the operating environment of the spindle motor. The method of controlling the spindle motor, using the current gain change of the spindle motor driver, includes monitoring a spindle drive control signal indicating the operating environment of the spindle motor and changing a current gain of the spindle motor driver based on the indicated operating environment.

21 Claims, 6 Drawing Sheets

METHOD, MEDIUM, AND APPARATUS CONTROLLING CURRENT GAIN CHANGE OF A SPINDLE MOTOR DRIVER

CROSS-REFERENCE TO RELATED APPLICATIONS

This application claims the priority of Korean Patent Application No. 10-2004-0104632, filed on Dec. 11, 2004, in the Korean Intellectual Property Office, the disclosure of which is incorporated herein in its entirety by reference.

BACKGROUND OF THE INVENTION

1. Field of the Invention

Embodiments of the present invention relate to a method, medium, and apparatus controlling a spindle motor, and more particularly, to a method, medium, and apparatus controlling a spindle motor to rotate at a constant speed by changing a current gain of a spindle motor driver, in a disk drive, according to the operating environment of the spindle motor.

2. Description of the Related Art

Conventionally, as in U.S. Patent Publication No. 6,744,587, a motor control circuit has been used to control the application of drive current to a motor using parallel paths, each of which included a digital-to-analog converter operating over different dynamic gains according to angular velocity. Similarly, Japanese Patent Laid-Open Publication No. 2003-173640 discusses the controlling of a voice coil motor using gains of a digital-to-analog converter in a track-seek mode and a track-following mode of a disk drive.

Typically, disk drives rotate a medium, e.g., a disk, at a target frequency (RPM) and at a constant speed using a spindle motor, and apply write or read signals to a magnetic head over the constantly rotating disk. To rotate the disk at a more accurate speed, the current gain of a motor drive circuit should be changed.

In general, a separate sensor is not used for a spindle motor, rather, a current measurement value obtained by resistance is used to determine the value of current fed back to the motor drive circuit. The maximum value of current supplied to the motor is set according to the amount of sensor resistance, and the resolution of the current is determined according to the resolution of a digital-to-analog converter embedded in the motor drive circuit. Here, there is an interrelationship between the maximum current value and the resolution. Accordingly, the sensor resistance can be properly set to satisfy both the maximum current value and the resolution.

When controlling the speed of the spindle motor, to reach a target speed more quickly, a higher maximum current value is required. Conversely to accurately control a motor speed, a higher resolution is required, which requires a lower current value. Accordingly, current gain changes must be made with these two desires taken into consideration.

That is, the resolution is increased by setting a resistance value satisfying the required maximum current and by reducing a high current gain after startup. If the current gain is reduced, the maximum current value is limited, but the same resolution of the digital-to-analog converter is applied within a limited variable current range, thereby increasing the resolution of current. The increased current resolution makes more accurate control possible.

Accordingly, to efficiently drive the motor, the motor is controlled using a high current gain with a low resolution, which allows for the use of the maximum current, at the startup. However, once the motor reaches the target speed, the motor is precisely controlled using a low current gain, with the higher resolution being obtained through the current gain change.

That is, the conventional method of controlling the current gain of the spindle motor driver in the disk drive includes setting the current gain to the highest level to supply the maximum current during the startup, monitoring the rotational speed of the spindle motor, and reducing the current gain to perform precise control of the spindle motor speed once the rotational speed reaches the target speed.

However, such a conventional control algorithm generally does not encounter problems at room temperature and constant voltage, but problems do occur in low temperature environments when the frictional force between a fluid dynamic bearing and a shaft of the motor increases. Additional problems of low voltage environments are that power relatively decreases and the maximum current may become saturated, as shown in FIG. 7-8 where changes of a digital-to-analog converted spindle drive control signal Spin DAC of the spindle motor driver are illustrated in a normal state and in an abnormal (low temperature and low voltage) state. Consequently, the motor may fail to reach the target frequency or fail to operate at the desired constant speed.

SUMMARY OF THE INVENTION

Embodiments of the present invention provide a method, medium, and apparatus for controlling current gain change of a spindle motor driver, by detecting the operating environment of a spindle motor and automatically changing a current gain of the spindle motor driver to an optimum gain based on the detected operating environment, thereby enabling the spindle motor to rotate at a constant speed.

To achieve the above and/or other aspects and advantages, embodiments of the present invention include a method of controlling a spindle motor, including monitoring a spindle drive control signal indicating an operating environment of the spindle motor, and controlling a current gain for a spindle motor driver based on the indicated operating environment of the spindle drive control signal.

The spindle drive control signal may correspond to a difference between a spindle motor target speed and a detected speed of the spindle motor.

The method may further include converting a digital spindle drive control signal into an analog a spindle drive control signal.

In addition, the controlling of the current gain for the spindle motor driver may include comparing a value representative of the spindle motor drive control signal with first and second critical values, and reducing the current gain if the value representative of the spindle drive control signal is lower than the first critical value, increasing the current gain if the value representative of the spindle drive control signal is higher than the second critical value, and maintaining the current gain if the value representative of the spindle drive control signal is between the first critical value and the second critical value.

The second critical value may be higher than two times the first critical value and lower than a maximum value, and the first critical value may be lower than one half of the maximum value.

The current gain may be controlled by being reduced by one half of a maximum current gain a predetermined number of times. In addition, the current gain may be controlled to be a maximum current gain when the spindle motor is initially started. The current gain may similarly be controlled to change after the spindle motor reaches a target speed after an initial startup of the spindle motor. If the spindle motor fails to reach a target speed, after the current gain has been changed to a maximum gain, operation of the spindle motor may be stopped and then restarted.

To achieve the above and/or other aspects and advantages, embodiments of the present invention include at least one medium including computer readable code to implement embodiments of the present invention.

To achieve the above and/or other aspects and advantages, embodiments of the present invention include a hard disk drive, including a read/write transducer to read and/or write data from/to a disk, and a spindle motor to rotate the disk at a predetermined speed for the reading and/or writing of data by implementing a method of the present invention.

To achieve the above and/or other aspects and advantages, embodiments of the present invention include an apparatus controlling a current gain change of a spindle motor driver, the apparatus including a spindle drive controller to generate a spindle drive control signal corresponding to a difference between a spindle motor target speed and a detected spindle motor speed, a comparator to compare the spindle drive control signal with first and second critical values and to generate a gain switching control signal corresponding to a result of the comparison, and a spindle driver to control a current gain of the spindle motor driver according to the gain switching control signal, to amplify a detected spindle current using the changed current gain, and to generate a spindle drive current corresponding to a difference between the spindle drive control signal and the amplified detected spindle current.

The apparatus may further include a digital-to-analog converter to convert a digital spindle drive control signal into an analog spindle drive control signal.

The comparator may generate a gain switching control signal to reduce the current gain if a value of the spindle drive control signal is lower than the first critical value, generate the gain switching control signal to increase the current gain if the value of the spindle drive control signal is higher than the second critical value, and generate the gain switching control signal to maintain the current gain if the value of the spindle drive control signal is between the first critical value and the second critical value.

The second critical value may be higher than two times the first critical value and lower than a maximum value, and the first critical value may be lower than one half of the maximum value.

The current gain may be controlled to change by being reduced by one half of a maximum current gain a predetermined number of times. Further, the current gain may be controlled to be a maximum current gain value when the spindle motor is initially started. Similarly, the current gain may be controlled to change after the spindle motor reaches a target speed after an initial startup of the spindle motor.

To achieve the above and/or other aspects and advantages, embodiments of the present invention include a hard disk drive, including a read/write transducer to read and/or write data from/to a disk, a spindle motor to rotate the disk at a predetermined speed for the reading and/or writing of data, and an apparatus of the present invention controlling a current gain change of a spindle motor driver for the spindle motor.

To achieve the above and/or other aspects and advantages, embodiments of the present invention include a hard disk drive, including a read/write transducer to read and/or write data from/to a disk, a spindle motor to rotate the disk at a predetermined speed for the reading and/or writing of data, and spindle motor driver, to control a speed of the spindle motor, including a means for controlling a current gain for the spindle motor driver based on a detected operating environment of the hard disk drive.

The spindle motor driver may further include a means for monitoring a spindle drive control signal indicating the operating environment for controlling the current gain for the spindle motor.

To achieve the above and/or other aspects and advantages, embodiments of the present invention include an apparatus controlling a current gain change of a spindle motor driver, the apparatus including a spindle drive controller to generate a spindle drive control signal corresponding to a difference between a spindle motor target speed and a detected spindle motor speed, and a spindle driver to control a current gain of the spindle motor driver according to a gain switching control signal and to generate a spindle drive current corresponding to a difference between the spindle drive control signal and the detected spindle current.

The apparatus may further include a comparator to compare the spindle drive control signal with first and second critical values and to generate the gain switching control signal.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
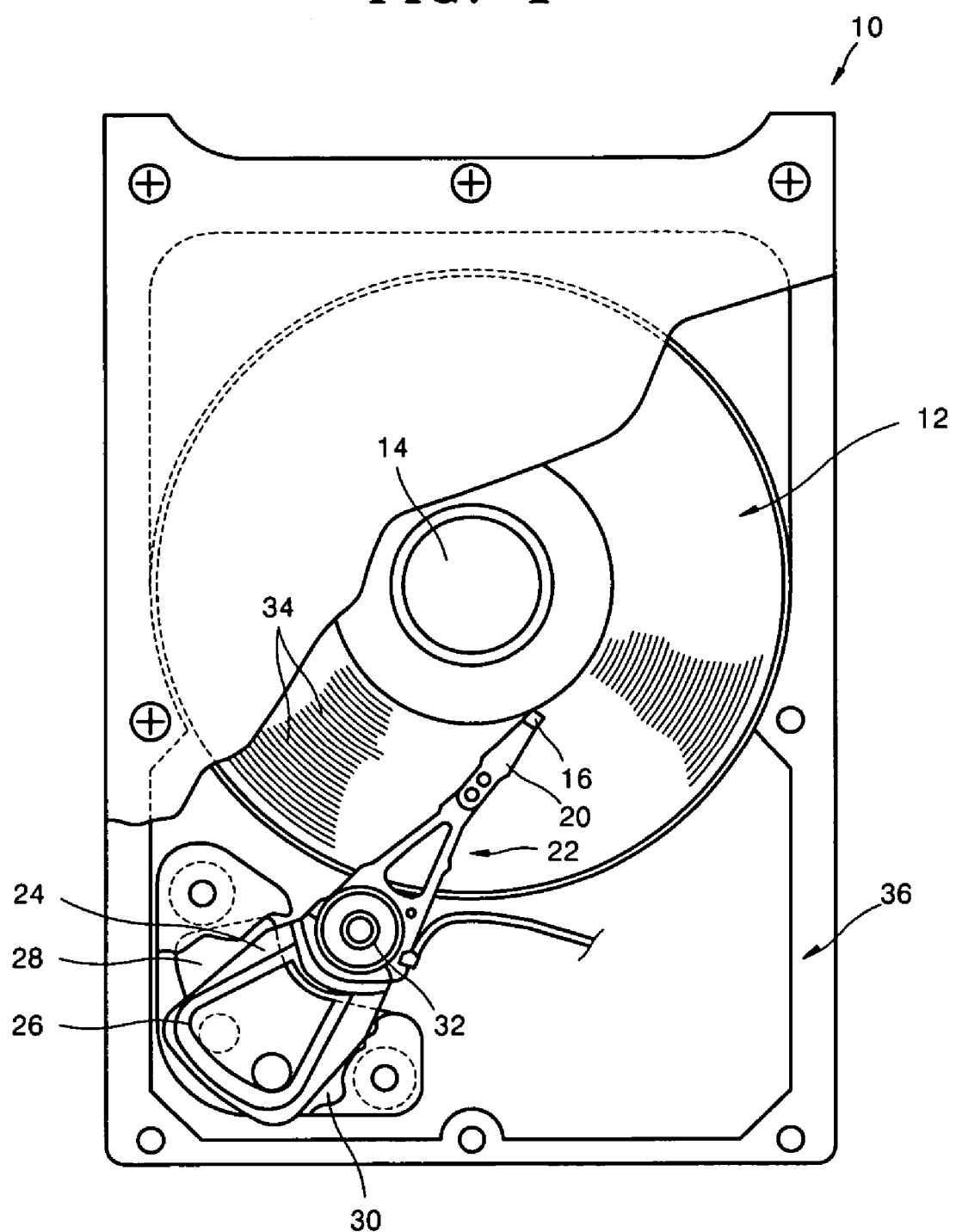
FIG. 1 illustrates a hard disk drive (HDD), according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

In the following discussion, embodiments of the present invention will be explained through references to a hard disk drive (HDD), as an example of a data storage device in which a spindle motor may be implemented. However, embodiments of the present invention are not limited to HDDs and are applicable to any device implementing a spindle motor.

FIG. 1 illustrates an HDD 10, according to an embodiment of the present invention. The HDD 10 may include at least one magnetic disk 12 that is rotatable by a spindle motor 14. The HDD 10 may further include a transducer 16 adjacent to a surface of the disk 12.

The transducer 16 can be utilized to read or write information from/to the rotating disk 12, e.g., by modifying and/or detecting a magnetic field along each disk. The transducer 16 is typically associated with the surface of the disk. Although one transducer 16 is shown in FIG. 1, it should be understood that the transducer 16 may be divided into a write transducer for magnetizing portions of the disk 12 and a read transducer for detecting the magnetic field along portions of the disk 12. As an example, the read transducer may be constructed from a magneto-resistive (MR) element, and is commonly referred to as a head.

The transducer 16 can be mounted on a slider 20, with the slider 20 generating an air bearing between the transducer 16 and the surface of the disk 12. The slider 20 may be incorporated into a head gimbal assembly (HGA) 22 attached to an actuator arm 24 having a voice coil 26. The voice coil 26 may be located adjacent to a magnetic assembly 28, thereby making up a voice coil motor (VCM) 30. Current supplied to the voice coil 26 generates a torque for rotating the actuator arm 24 about a bearing assembly 32, causing the transducer 16 to traverse over the surface of the disk 12.

Information may typically be stored on the disk 12 in annular tracks 34, which generally further include a plurality of sectors. Each of the sectors may still further include a data field and an identification field. As an example, the identification field may include a gray code that identifies the sector and the track (cylinder). The transducer 16, thus, moves over the surface of the disk 12 to read and/or write information on different tracks.

Figure 2:
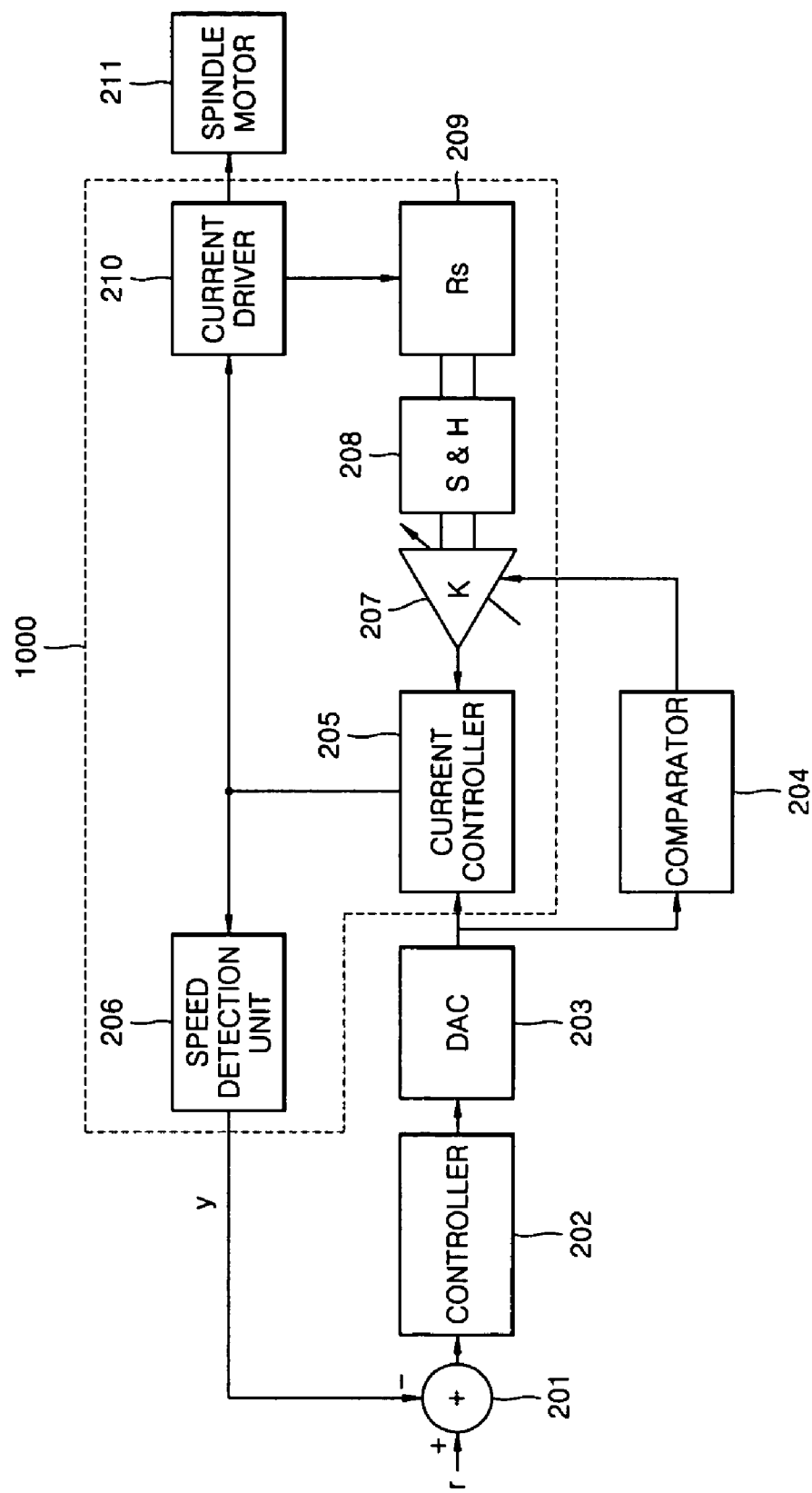
FIG. 2 illustrates an apparatus for controlling current gain change of a spindle motor driver, according to an embodiment of the present invention.

FIG. 2 illustrates an apparatus for controlling current gain change in a disk drive, according to an embodiment of the present invention.

Referring to FIG. 2, the apparatus may include a subtractor 201, a controller 202, a digital-to-analog converter DAC 203, a comparator 204, a current controller 205, a speed detection unit 206, a variable gain amplifier 207, a sampling holder S&H 208, a drive current sensor resistor Rs 209, a current driver 210, and a spindle motor 211, for example.

Among these potential elements, a circuit including the subtractor 201 and the controller 202 may be referred to as a spindle drive control circuit, and a circuit including the current controller 205, the speed detection unit 206, the variable gain amplifier 207, the sampling holder S&H 208, the drive current sensor resistor Rs 209, and the current driver 210, for example, may be referred to as a spindle drive circuit 1000.

The controller 202 may generate a digital drive control signal proportional to a difference between a target speed "r" of the spindle motor 211, and a detected speed "y" of the spindle motor 211. The digital drive control signal, thus, may be a factor indicating the operating environment of the spindle motor 211.

The digital-to-analog converter 203 may convert the digital drive control signal into an analog signal and output the same to the current controller 205 and the comparator 204, for example.

The comparator 204 may compare the output of the digital-to-analog converter 203 with a first critical value $\alpha$ and a second critical value $\beta$, and generate a gain switching control signal corresponding to the comparison result.

That is, the comparator 204 may generate a gain switching control signal to reduce a current gain if the output value of the digital-to-analog converter 203 is lower than the first critical value $\alpha$, generate a gain switching control signal to increase the current gain if the output value of the digital-to-analog converter 203 is higher than the second critical value $\beta$, and generate a gain switching control signal to maintain a present current gain if the output value of the digital-to-analog converter 203 is between the first critical value $\alpha$ and the second critical value $\beta$.

Figure 4:
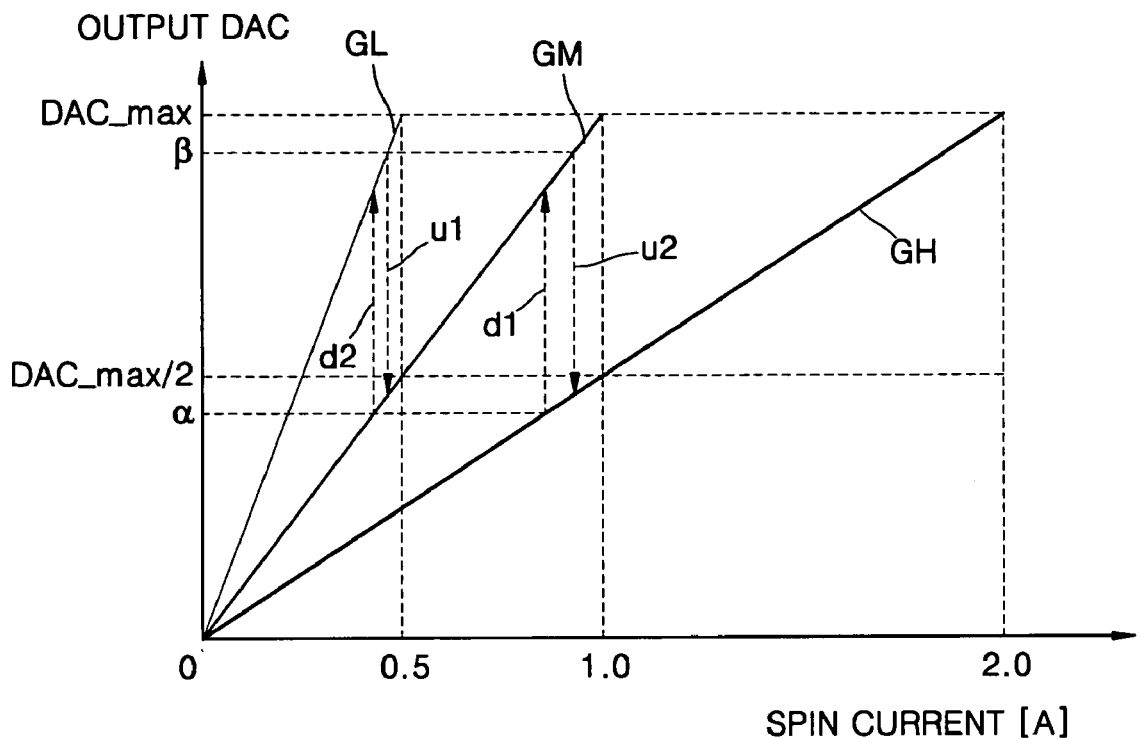
FIG. 4 illustrates a relationship between a spindle drive control signal of a digital-to-analog converter and a spindle drive current for explaining a control current gain change of the spindle motor driver according to an embodiment of the present invention.

As shown in FIG. 4, the second critical value $\beta$ may be higher than two times the first critical value $\alpha$ and lower than a maximum value $DAC_{\_MAX}$ of the digital-to-analog converted spindle drive control signal Spin DAC, and the first critical value $\alpha$ may be lower than $DAC_{\_MAX}/2$.

Since the value of the spindle drive control signal Spin DAC of the spindle motor driver may be doubled when the gain is reduced by half, the value of the spindle drive control signal Spin DAC of the spindle motor driver, before gain change, should be lower than half of the maximum value $DAC_{\_MAX}$ to prevent saturation. Further, the spindle drive control signal Spin DAC, doubled when the gain is reduced by half, should be lower than the second critical value $\beta$ in order to prevent an inadvertent subsequent return to the previous gain upon the next comparison. The value of the spindle drive control signal Spin DAC, reduced by half when the gain is doubled, should be higher than the first critical value $\alpha$ in order to prevent an inadvertent subsequent return to the previous gain upon the next comparison.

The gain of the variable gain amplifier 207 may be changed according to the gain switching control signal produced by the comparator 204.

The drive current sensor resistor Rs 209 may detect output current of the current driver 210, for driving the spindle motor 211, the sampling holder S&H 208 may sample and hold the current detected by the drive current detecting resistor 209, and the variable gain amplifier 207 may amplify the current sampled and held by the sampling holder 208. Here, the gain of the variable gain amplifier 207 may be changed according to the gain switching control signal. In an embodiment, as shown in FIG. 4, the gain may be allotted into high gain GH, medium gain GM, and low gain GL. Of course, the gain of the variable gain amplifier 207 can be divided, or divided twice or more gains, for example, according to the desired design.

The current controller 205 may generate current for reducing a current error, that is, a difference between the digital-to-analog converted spindle drive control signal Spin DAC and the detected spindle drive current amplified by the variable gain amplifier 207. Then, the current driver 210 may amplify the current produced by the current controller 205 with a predetermined gain and output the amplified current to the spindle motor 211. Here, the speed detection unit 206 may detect a counter electromotive force caused by the change of the current of the spindle motor 211 and measure the speed of the spindle motor 211, for example.

Figure 3:
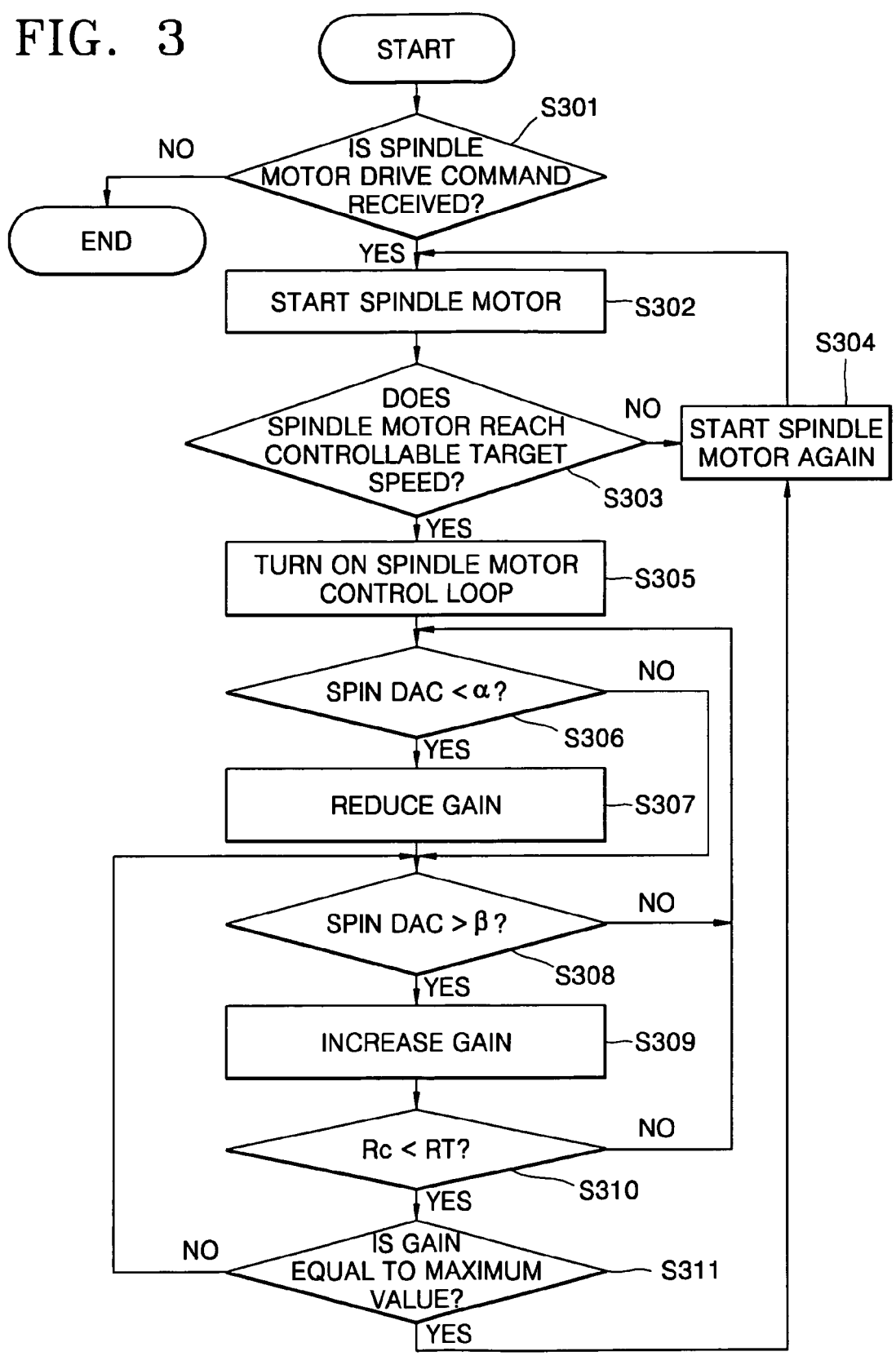
FIG. 3 illustrates a method for controlling current gain change of a spindle motor driver, according to an embodiment of the present invention.

A method of controlling a current gain change of the spindle motor driver, in the disk drive, according to an embodiment of the present invention, will now be further described with reference to the flow chart of FIG. 3.

First, in operation S301, it may be determined whether the controller 202 receives a spindle motor drive command. The spindle motor drive command may be received from a host device (not shown) or may be generated by an internal firmware when power is supplied to the disk drive.

If it is determined, in operation S301, that the spindle motor drive command has been received, the controller 202 may start the spindle motor 211, in operation S302. After the initial startup, the spindle motor 211 may quickly reach a target speed, e.g., as soon as possible, by maintaining the gain of the variable gain amplifier 207 in the high gain GH state and applying the available maximum current to the spindle motor 211.

While the initial startup may be performed in operation S302 for a predetermined period of time, operation S303 may also be performed. In operation S303, it may be determined whether the spindle motor 211 has reached a controllable target speed.

If it is determined in operation S303 that the spindle motor 211 has not been reached the target speed, within the predetermined period of time after the initial startup, the spindle motor may be considered to be in an abnormal state. Accordingly, in operation S304, the spindle motor 211 may be stopped and then started again.

However, if it is determined in operation S303 that the spindle motor 211 reaches the target speed within the predetermined period of time, after the initial startup, a spindle motor control loop may be turned on and the spindle motor 211 may be controlled by the feed back error current to rotate at a normal speed, in operation S305.

While the spindle motor 211 is controlled to rotate at the normal speed, in operation S306, the digital-to-analog converted spindle drive control signal Spin DAC may be compared with the first critical value $\alpha$.

If it is determined in operation S306 that the digital-to-analog converted spindle drive control signal Spin DAC is lower than the first critical value $\alpha$, the current gain may be shifted to a lower gain by one level, in operation S307. That is, since the gain after the startup of the spindle motor 211 has been maintained as high gain GH, the gain may be shifted to the medium gain GM. If the present gain is the medium gain GM, the present gain may be shifted to low gain GL. Accordingly, operation S307 increases the resolution of drive current when the spindle motor 211 operates in normal environment with a relatively low load to achieve more precise speed control.

Figure 5:
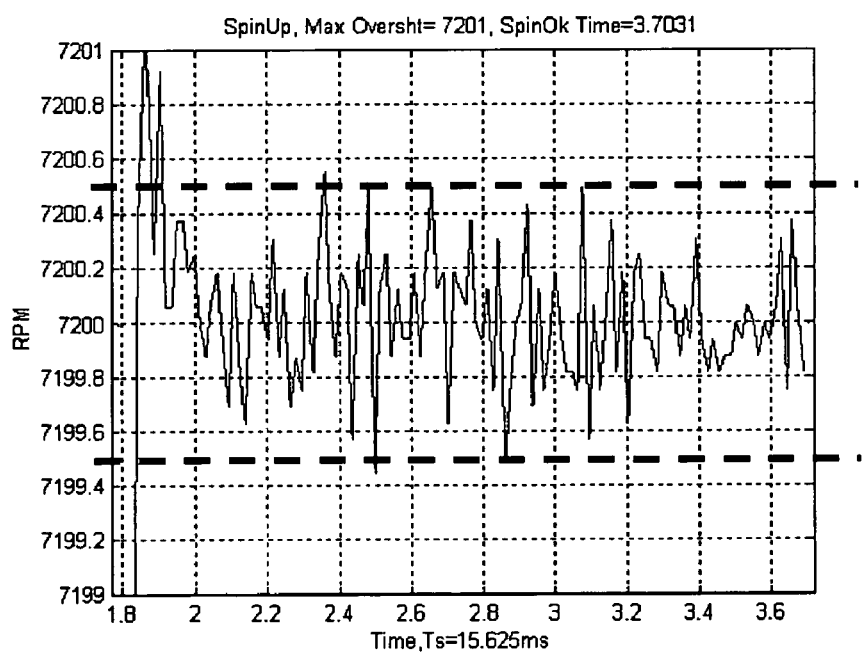
FIG. 5 illustrates the speed variation of the spindle motor right after reaching a target speed when the operating environment is set to high gain GH, according to an embodiment of the present invention.
Figure 6:
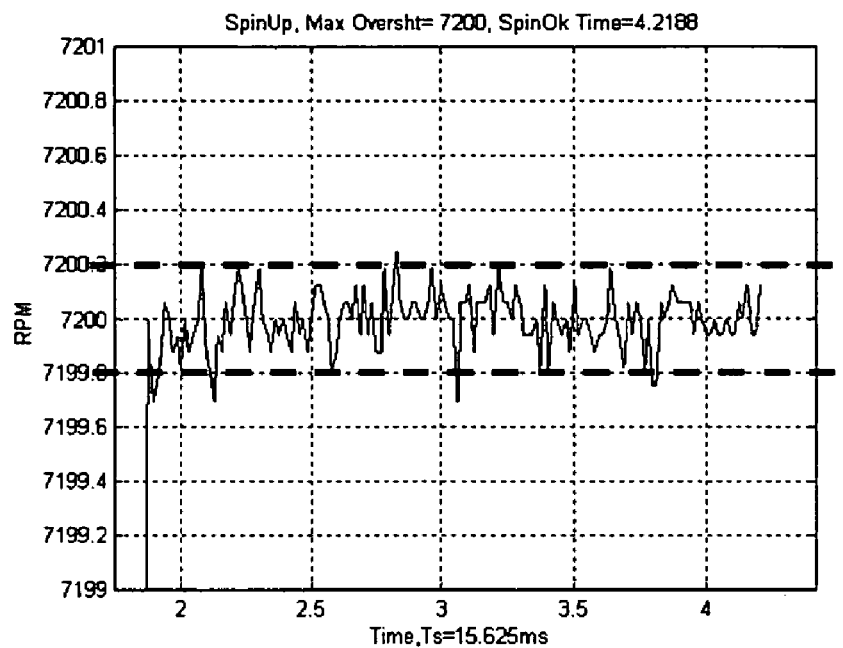
FIG. 6 illustrates the speed variation of the spindle motor right after reaching a target speed when operating environment is set to low gain GL, according to an embodiment of the present invention.
Figure 7:
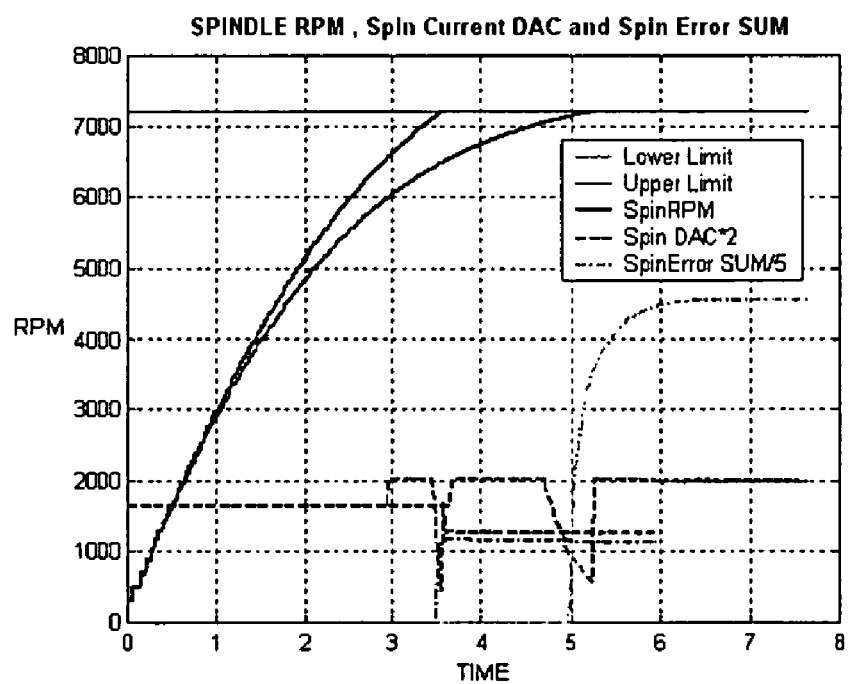
FIGS. 7-8 illustrates changes of a digital-to-analog converted spindle drive control signal Spin DAC of the spindle motor driver in a normal state and in an abnormal (low temperature and low voltage) state.
Figure 8:
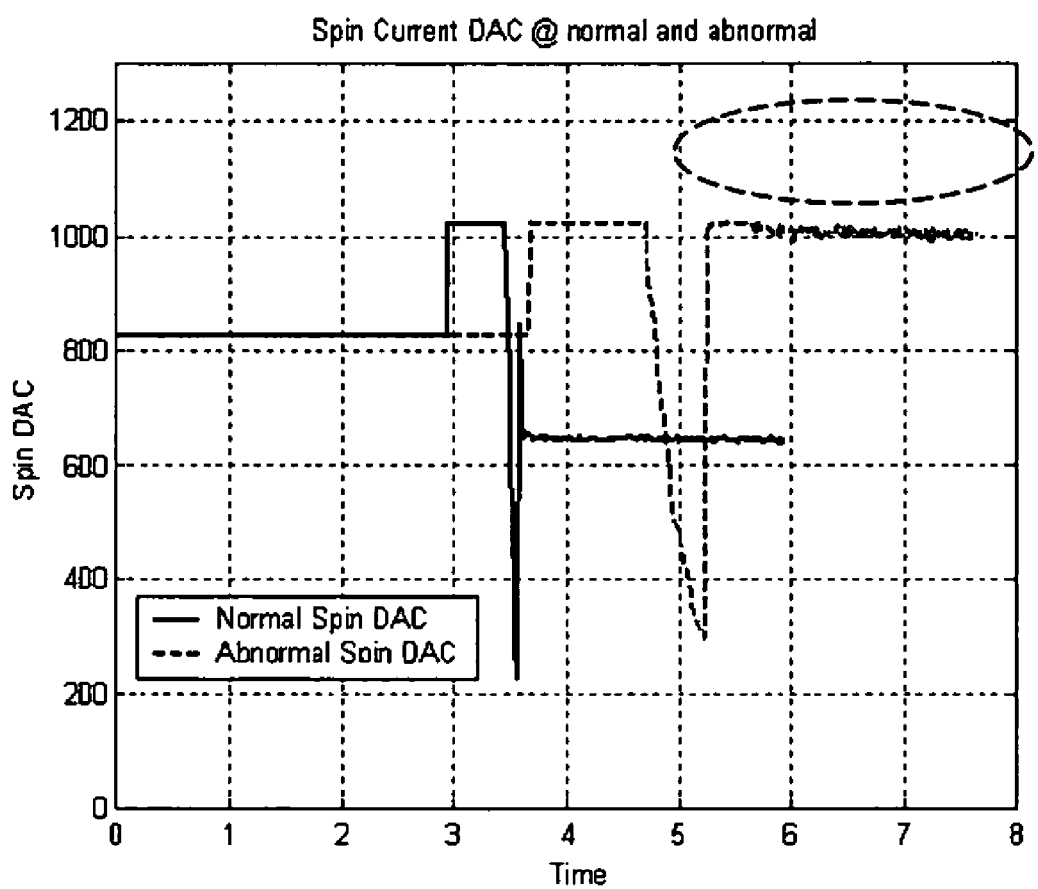

The speed variation of the spindle motor 211 when the spindle motor 211 is in normal operating environment and the gain is high gain GH is illustrated in FIG. 5, and the speed variation of the spindle motor 211 after the gain has changed to the low gain GL is illustrated in FIG. 6. It can be seen from FIGS. 5 and 6 that the amount of speed variation when the gain is changed to the low gain GL is greatly lower than the amount of speed variation when the gain is maintained at the high gain GH, thereby making precise control possible.

Referring to FIG. 4, if the gain is reduced, the value of the spindle drive control signal Spin DAC may be increased by d1 or d2 and the resolution of current may be increased, such that more precise control can be achieved as compared to when the gain is the high gain GH. If the critical value $\beta$ is higher than the value of the spindle drive control signal DAC increased by d1 or d2, when the gain is changed to the lower gain by one level, the gain after the gain change can thus be prevented from returning to the previous gain.

Then, in operation S308, the digital-to-analog converted spindle drive control signal Spin DAC may be compared with the second critical value $\beta$.

If it is determined in operation S308 that the digital-to-analog converted spindle drive control signal Spin DAC is not higher than the second critical value $\beta$, the process may return to operation S306.

However, if it is determined in operation S308 that the digital-to-analog converted spindle drive control signal Spin DAC is higher than the second critical value $\beta$, operation S309 may be performed. In operation S309, the current gain may be changed to a higher gain by one level. For example, if the present gain is the medium gain GM, the gain may be changed to high gain GH. As shown in FIG. 4, if the medium gain GM is changed to the high gain GH, the value of the spindle drive control signal Spin DAC is reduced by u2 and the resolution of the current is reduced such that control precision is reduced, as compared to when the gain is the medium gain GM but a suppliable maximum spindle drive current SPIN CURRENT can be doubled. Operation S309 prevents the saturation of the spindle drive control signal Spin DAC when the environment changes to a low temperature and low voltage environment and load applied to the spindle motor may be increased.

In even this case, the first critical value $\alpha$ is lower than the value of the spindle drive control signal DAC reduced by u1 or u2 due to the gain change, so as to prevent an inadvertent return to the previous gain right after the gain change.

Then, in operation S310, it may be determined whether the spindle motor 211 is maintained at a target speed.

If it is determined in operation S310 that the spindle motor 211 has been maintained at the target speed, the process may return to operation S306.

However, if it is determined in operation S310 that the spindle motor 211 has not reached the target speed yet, operation S311 may be performed. In operation S311, it may be determined whether the present gain is a maximum gain. According to an embodiment of the present invention where it is assumed that the gain is classified into high gain GH, medium gain GM, and low gain GL, the maximum gain becomes the high gain GH.

If it is determined in operation S311 that the present gain is the high gain GH, that is, the maximum gain, the spindle drive current cannot be further increased, and thus, the spindle motor may be considered to be in an abnormal state. Accordingly, the process can return to operation S304. In operation S304, the spindle motor 211 is stopped and then started again.

If it is determined in operation S311 that the present gain is not the high gain GH, that is, the maximum gain, the process may return to operation S308.

As described above, since embodiment of the present invention monitor various types of spindle motor drive control signals indicating the operating environment of the spindle motor and change the current gain of the spindle motor driver to an optimum gain, the spindle motor can be precisely controlled using the optimum current gain suitable for its operating environment to prevent current saturation.

Although the current gain change of the spindle motor driver may be performed based on the digital-to-analog converted spindle drive control signal Spin DAC, in embodiments, various types of spindle motor drive control signals indicating the operating environment of the spindle motor can be monitored to change the current gain of the spindle motor driver.

Embodiments of the present invention may be implemented by a method, an apparatus, a system, etc. If embodiments are performed by computer readable code, constitutional elements of embodiments may include code segments that perform differing operations, e.g., essential operations.

Computer readable code or code segments maybe be stored/transferred through a medium, e.g., processor-readable media, and can be transmitted by computer data signals combined with carrier waves via transmission media or communication networks, for example. The media may include any medium/media that can store and/or transmit information. Examples of the media can include electronic circuits, semiconductor memory devices, read-only memories (ROMs), erasable ROMs, floppy disks, optical disks, hard disks, optical fibre media, and radio frequency (RF) networks, noting that differing embodiments are equally available. The computer data signals may include any signals that can be transmitted over transmission media, such as electronic network channels, optical fibres, air, electronic systems, and RF networks, for example, again noting that differing embodiments are equally available.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of controlling a spindle motor, comprising:
monitoring a spindle drive control signal corresponding to a difference between a spindle motor target speed and a detected speed of the spindle motor; and
controlling a current gain for a spindle motor driver to increase the current gain if the spindle drive control signal exceeds an initial predetermined range, and controlling the current gain to reduce the current gain if the spindle drive control signal is below the initial predetermined range.

2. The method of claim 1, further comprising converting a digital spindle drive control signal into an analog spindle drive control signal.

3. A method of controlling a spindle motor, comprising:
monitoring a spindle drive control signal indicating an operating environment of the spindle motor; and
controlling a current gain for a spindle motor driver based on the indicated operating environment of the spindle drive control signal,
wherein the controlling of the current gain for the spindle motor driver comprises:
comparing a value representative of the spindle motor drive control signal with first and second critical values; and
reducing the current gain if the value representative of the spindle drive control signal is lower than the first critical value, increasing the current gain if the value representative of the spindle drive control signal is higher than the second critical value, and maintaining the current gain if the value representative of the spindle drive control signal is between the first critical value and the second critical value.

4. The method of claim 3, wherein the second critical value is higher than two times the first critical value and lower than a maximum value, and the first critical value is lower than one half of the maximum value.

5. A method of controlling a spindle motor, comprising:
monitoring a spindle drive control signal indicating an operating environment of the spindle motor; and
controlling a current gain for a spindle motor driver based on the indicated operating environment of the spindle drive control signal,
wherein the current gain is controlled by being reduced by one half of a maximum current gain a predetermined number of times.

6. The method of claim 1, wherein the current gain is controlled to be a maximum current gain when the spindle motor is initially started.

7. A method of controlling a spindle motor, comprising:
monitoring a spindle drive control signal indicating an operating environment of the spindle motor; and
controlling a current gain for a spindle motor driver based on the indicated operating environment of the spindle drive control signal,
wherein the current gain is controlled to change after the spindle motor reaches a target speed after an initial startup of the spindle motor.

8. A method of controlling a spindle motor, comprising:
monitoring a spindle drive control signal indicating an operating environment of the spindle motor; and
controlling a current gain for a spindle motor driver based on the indicated operating environment of the spindle drive control signal,
wherein if the spindle motor fails to reach a target speed, after the current gain has been changed to a maximum gain, operation of the spindle motor is stopped and then restarted.

9. At least one medium comprising computer readable code to implement the method of claim 1.

10. A hard disk drive, comprising:
a read/write transducer to read and/or write data from/to a disk; and
a spindle motor to rotate the disk at a predetermined speed for the reading and/or writing of data by implementing the method of claim 1.

11. An apparatus controlling a current gain change of a spindle motor driver, the apparatus comprising:
a spindle drive controller to generate a spindle drive control signal corresponding to a difference between a spindle motor target speed and a detected spindle motor speed;
a comparator to compare the spindle drive control signal with an initial predetermined range and to generate a gain switching control signal to increase a current gain if the spindle drive control signal exceeds the initial predetermined range and to reduce the current gain if the spindle drive control signal is below the initial predetermined range; and
a spindle driver to control the current gain of the spindle motor driver according to the gain switching control signal, to amplify a detected spindle current using the changed current gain, and to generate a spindle drive current corresponding to a difference between the spindle drive control signal and the amplified detected spindle current.

12. The apparatus of claim 11, further comprising a digital-to-analog converter to convert a digital spindle drive control signal into an analog spindle drive control signal.

13. The apparatus of claim 11, wherein the comparator generates the gain switching control signal to reduce the current gain if a value of the spindle drive control signal is lower than a first critical value, generates the gain switching control signal to increase the current gain if the value of the spindle drive control signal is higher than a second critical value, and generates the gain switching control signal to maintain the current gain if the value of the spindle drive control signal is between the first critical value and the second critical value.

14. The apparatus of claim 13, wherein the second critical value is higher than two times the first critical value and lower than a maximum value, and the first critical value is lower than one half of the maximum value.

15. The apparatus of claim 11, wherein the current gain is controlled to change by being reduced by one half of a maximum current gain a predetermined number of times.

16. The apparatus of claim 11, wherein the current gain is controlled to be a maximum current gain value when the spindle motor is initially started.

17. The apparatus of claim 11, wherein the current gain is controlled to change after the spindle motor reaches a target speed after an initial startup of the spindle motor.

18. A hard disk drive, comprising:
a read/write transducer to read and/or write data from/to a disk;
a spindle motor to rotate the disk at a predetermined speed for the reading and/or writing of data; and
the apparatus of claim 11 controlling a current gain change of a spindle motor driver for the spindle motor.

19. A hard disk drive, comprising:
a read/write transducer to read and/or write data from/to a disk;
a spindle motor to rotate the disk at a predetermined speed for the reading and/or writing of data; and
spindle motor driver, to control a speed of the spindle motor, comprising a spindle drive controller to generate a spindle drive control signal corresponding to a comparison between a spindle motor target speed and a detected spindle motor speed and a means for controlling a current gain for the spindle motor driver to increase the current gain if the spindle drive control signal exceeds an initial predetermined range and to reduce the current gain if the spindle drive control signal is below the initial predetermined range.

20. An apparatus controlling a current gain change of a spindle motor driver, the apparatus comprising:
a spindle drive controller to generate a spindle drive control signal corresponding to a difference between a spindle motor target speed and a detected spindle motor speed;
a comparator to compare the spindle drive control signal with an initial predetermined range and to generate a gain switching control signal to increase a current gain if the spindle drive control signal exceeds the initial predetermined range and to reduce the current gain if the spindle drive control signal is below the initial predetermined range; and
a spindle driver to control the current gain of the spindle motor driver according to the gain switching control signal and to generate a spindle drive current corresponding to a difference between the spindle drive control signal and a detected spindle current.

21. A hard disk drive, comprising:
a read/write transducer to read and/or write data from/to a disk;
a spindle motor to rotate the disk at a predetermined speed for the reading and/or writing of data; and
the apparatus of claim 20 controlling a current gain change of a spindle motor driver for the spindle motor.

* * * * *